United States Patent
Becker et al.

(10) Patent No.: US 7,597,400 B2
(45) Date of Patent: Oct. 6, 2009

(54) HINGE MOUNTING WITH WEDGE CLEARANCE COMPENSATION

(75) Inventors: Burckhard Becker, Solingen (DE); Franz Hari, Troisdorf (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 334 days.

(21) Appl. No.: 11/332,677

(22) Filed: Jan. 13, 2006

(65) Prior Publication Data

US 2006/0152057 A1 Jul. 13, 2006

(30) Foreign Application Priority Data

Jan. 13, 2005  (DE) ................. 10 2005 001 798

(51) Int. Cl.
*B60N 2/02* (2006.01)

(52) U.S. Cl. .................................................. 297/364

(58) Field of Classification Search .......... 297/362, 297/363, 364, 366, 367
See application file for complete search history.

(56) References Cited

U.S. PATENT DOCUMENTS

| | | | | |
|---|---|---|---|---|
| 4,227,741 A | * | 10/1980 | Gross et al. ............ | 297/362 |
| 4,371,207 A | * | 2/1983 | Wilking et al. ......... | 297/344.15 |
| 4,715,656 A | * | 12/1987 | Walk et al. ............. | 297/362 |
| 5,154,475 A | * | 10/1992 | Kafitz .................... | 297/362 |
| 5,277,672 A | * | 1/1994 | Droulon et al. ........ | 475/176 |
| 5,524,970 A | * | 6/1996 | Kienke et al. ......... | 297/362 |
| 5,536,217 A | * | 7/1996 | Droulon et al. ........ | 475/177 |
| 6,692,397 B2 | * | 2/2004 | Wang et al. ............ | 475/162 |

* cited by examiner

*Primary Examiner*—Joseph F Edell
(74) *Attorney, Agent, or Firm*—McCarter & English, LLP

(57) ABSTRACT

The hinge mounting for an adjustable vehicle seat has a first ring gear, a second ring gear, said two ring gears being rotatable relative to each other about an axis and being centered on said axis, and a driver unit which comprises a) a shaft for initiating an adjusting movement, said shaft being centered on said axis, b) a central, circular recess that is offset a distance e) with respect to the axis, c) a driver member that is located in the recess, fits against said recess and is rotationally joined to the shaft and d) a compensation unit comprising a wedge-shaped piece connected to the shaft, a mating surface cooperating with the wedge-shaped piece and formed on the driver member and an elastic means that biases the driver member in such a manner that the driver member is urged toward the topmost point of the wedge-shaped piece, characterized in that the driver member has a radial cut-out having a basis formed by the mating surface.

12 Claims, 2 Drawing Sheets

HINGE MOUNTING WITH WEDGE CLEARANCE COMPENSATION

CROSS-REFERENCE TO RELATED APPLICATIONS

This application claims priority to German Application No. DE 10 2005 001 798.3, filed Jan. 13, 2005, the contents of which are expressly incorporated by reference in their entirety as part of the present disclosure.

BACKGROUND

The invention relates to a hinge mounting according to the preamble of patent claim 1.

Such a hinge mounting is known from the document DE 195 41 938 A1 of the applicant. On this prior art hinge mounting the first ring gear is formed on a first hinge arm and the second ring gear is likewise formed on a second hinge arm. Both ring gears are internal ring gears. The drive gear is configured to be an externally toothed, disc-shaped gear wheel in the central recess of which there is located the driver member, also known as the eccentric.

A similar hinge mounting is known from DE 30 13 304 A1. On this hinge mounting, clearance is compensated for by two wedge-shaped pieces that are curved to mate the recess. They are located where eccentricity is greatest. In contrast thereto, in the hinge mounting mentioned herein above, the driver member fits directly against that point of the recess that is the smallest distance apart from the eccentric axis. On the hinge mounting according to DE 44 37 073 A1 a curved leaf spring is provided in order to compensate for the clearance, said leaf spring being also located where eccentricity is greatest in the recess.

In principle, the hinge mounting of the type mentioned herein above has proved efficient and has been successfully realized and utilized in practice. It is suited for electric and manual operation. The invention aims at maintaining the advantages of the prior art hinge mounting. Its objective is to further develop this hinge mounting. The object of the invention is to develop the prior art hinge mounting in such a manner that it is of smaller construction, lighter and easier to mount.

SUMMARY OF THE INVENTION

This object is solved by the hinge mounting according to the features of patent claim 1.

On this hinge mounting, the driver member, also known as the eccentric, may be pushed laterally onto the shaft, it needs not be threaded onto it. The driver member may be configured to be quite small; the shaft is very much off center inside the recess. It may be located in immediate proximity to the inner surface area of the recess so that the gap left between shaft and recess is quite small. As compared to the state of the art mentioned herein above, the diameter of the recess is quite small.

The hinge mounting of the invention is particularly suited for what are termed lathed round plates which form a unit that may be manipulated and mounted as an entity and is in turn connected to a first hinge arm and to a second hinge arm.

In a preferred development of the invention, the recess is substantially completely filled with the shaft and the wedge-shaped piece.

It is preferred that the recess of the driver member be approximately the same width as the diameter of the shaft. By this arrangement, a small construction is achieved. In principle however, it is possible to make the recess wider and/or to provide the shaft with quite small a diameter.

It is preferred that a projection be connected to the shaft. Said projection forms the wedge-shaped piece on the one side, on the other side, it has two lateral dogs that are offset by 90° each with respect to the wedge-shaped piece. These lateral dogs fit against lateral faces of the recess. They cause the driver member to be rotated along with the shaft during rotation thereof.

However, it is also possible to configure the wedge surface within the contour of the shaft; for this purpose, a shaft is processed accordingly, inter alia turned to size, where the wedge surface and the dogs are located.

It is preferred that the wedge-shaped piece be itself solidly connected to the shaft. Another possibility however is to dispose the wedge-shaped piece so as to be movable relative to the shaft, namely in the axial direction, preferably in a guide means. In this case, a spring is preferably provided, said spring either assisting in the action of the elastic means or allowing it to be eliminated altogether and being disposed between the movable wedge-shaped piece and the shaft.

In another advantageous development, the projection has at least one axial abutment surface that fits axially against a ring gear. The elastic means causes the driver member to be loaded directly, with the shaft also being loaded axially as a result thereof, though. The axial movement of the shaft is limited by the abutment surface.

In an advantageous developed implementation, the shaft is out of round at one of its two ends at least. This out-of-round portion may e.g., be configured to be a hexagon socket. A driving part that is for example connected to the hand-wheel or a driving electric motor engages this hexagon socket. The shaft may be moved to a small extent in the axial direction with respect to this driving part.

BRIEF DESCRIPTION OF THE DRAWINGS

Other features and advantages of the invention will become more apparent upon reviewing the appended claims and the following non restrictive description of two embodiments of the invention, given by way of example only with reference to the drawing. In said drawing:

DETAILED DESCRIPTION

Figure 1:
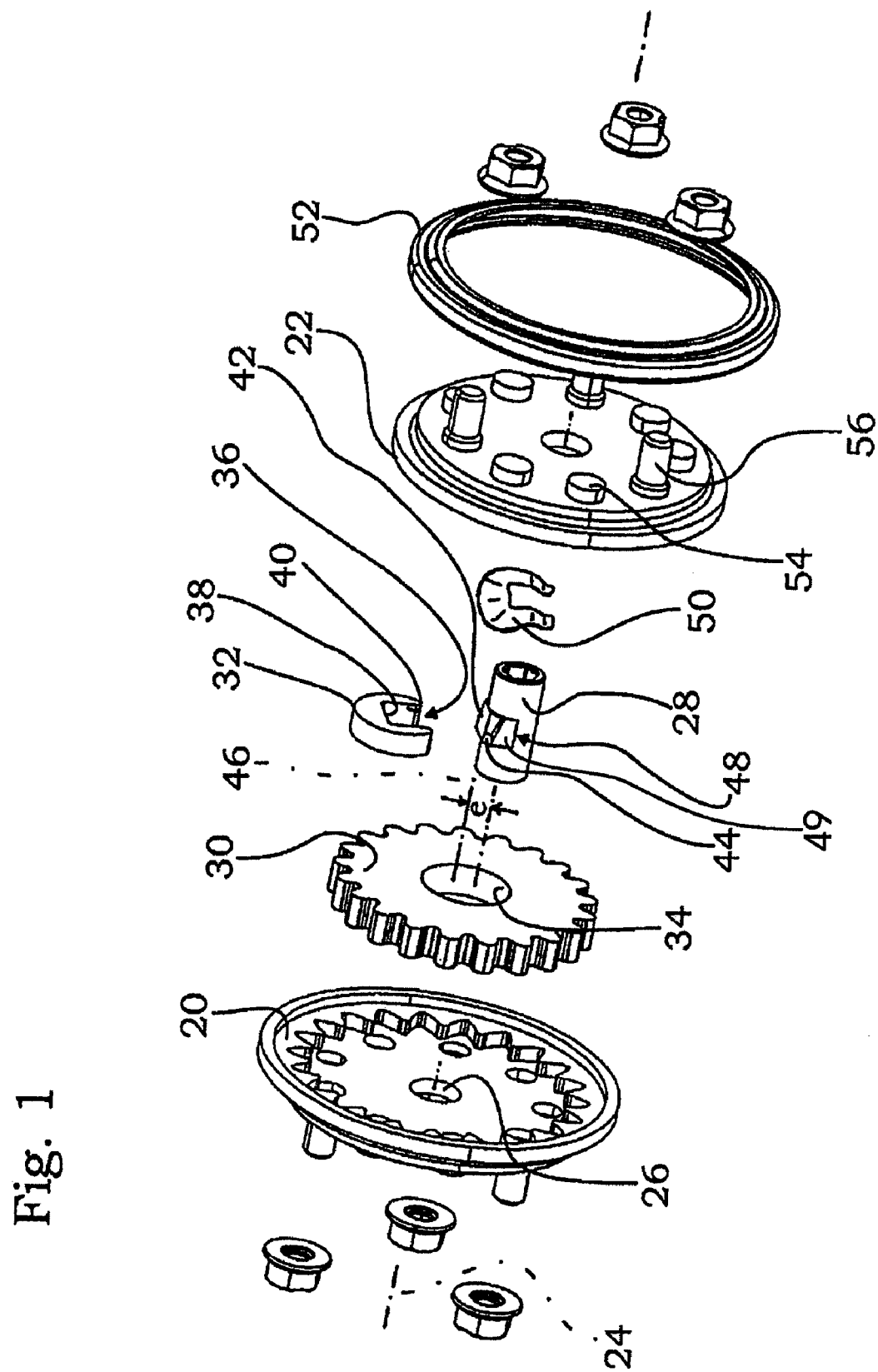
FIG. 1 is a perspective illustration in the form of an assembly drawing for a hinge mounting which is configured to be a round plate inside of which there is provided an elastic means.

The hinge mounting has a first ring gear 20 and a second ring gear 22. They are both centered about an axis 24 and rotatable relative to each other about this axis 24. For this purpose, they have one hole 26 each through which a shaft 28 extends freely. The shaft 28 is centered on the axis 24.

The shaft 28 is part of a driver unit which further includes a driver wheel 30, a driver member 32 and a compensating unit. The driver wheel 30 is configured to be an externally toothed gear wheel; it meshes with the internally toothed first ring gear 20 and with the internally toothed second ring gear 22. The driver wheel 30 is configured so as to be capable of wobbling inside the internal ring gears 20, 22.

In the embodiment shown, the driver wheel 30 is equipped with a toothed surface that is common to the two ring gears 20, 22 and is the same for the two ring gears 20, 22. It is absolutely possible to also have the driver wheel 30 made from two different gear wheels that are solidly connected together, the one gear wheel engaging the first ring gear 20 and the other gear wheel cooperating with the second ring gear 22. The driver wheel 30 has a recess 34 that is centered in its toothed surface and that is moreover circular.

In this recess 34 there is located the driver member 32. As can be seen from the FIGS., it is substantially U-shaped. It has an outer surface that extends over more than 180° and mates the recess 34. Where this outer surface ends, there commences a cut-out 36. It is defined by a mating surface 38 and by two identically built side faces 40. The mating surface 38 is inclined, it mates a wedge surface 42 formed by the wedge-shaped piece 44. The side faces 40 run parallel to each other. The mating surface 38 forms the base of the cut-out 36.

The outer surface of the driver member 32 is centered on an eccentric axis 46. Said eccentric axis is offset by a distance e with respect to the axis 24. The driver member 32 has a plane of symmetry. It lies in the plane defined by the axis 24 and the eccentric 46. Accordingly, it runs parallel to the side faces 40 and through the very center of the mating surface 38. The driver member 32 has a thickness (when measured in the axial direction) that approximately corresponds to the thickness of the driver wheel 30. The outer surface of the driver member 32 and/or the inner wall of the recess 34 may be provided with friction-minimizing means such as grease lubrication, PTFE anti-friction coatings, or with a friction or ball bearing.

The wedge-shaped piece 44 is part of a projection 48 that is solidly connected to the shaft 28. This projection 48 forms the wedge-shaped piece 44. This wedge-shaped piece 44 has a wedge surface 42 and two lateral dog faces 49 that are offset by 90° relative to the wedge surface 42, said dog faces 49 being parallel to the afore mentioned plane of symmetry. These dog faces 49 fit against the side faces 40 of the cut-out 36. The wedge surface 42 contacts the mating surface 38. If the driver member 32 is moved in the axial direction, its mating surface 38 slides along the wedge surface 42. As a result, the driver member 32 is moved a greater or a smaller radial distance apart from the axis 24, depending on the direction of the movement. This movement compensates for the clearance.

An elastic means 50 is associated with the driver member 32. In the embodiment according to FIG. 1, this elastic means 50 is an approximately U-shaped piece cut out from a spring steel sheet and curved. It covers substantially a side face of the driver member and fits against said side face; on the other side, the elastic means 50 fits against the second ring gear 22. The elastic means 50 urges the driver member 32 upward across the wedge surface 42 until the clearance is compensated for.

In the embodiment according to FIG. 1, the driver member 32 is axially movable. The shaft 28 may be axially movable, although this is not compulsory. In practical operation, the shaft 28 does not move in the axial direction, its abutment surface forming the projection 48 fits against the first ring gear 20. This projection 48 may be chosen to have such an axial length that the other abutment surface turned toward the second ring gear 22 is located in immediate proximity to the second ring gear 22 as well.

As can be seen from the FIGS., the two ring gears 20, 22 are substantially stamped from a circular blank. They are plate-shaped or cup-shaped. They provide a terminus in the axial direction and accordingly also perform the function of housing parts.

The two ring gears 20, 22 have a peripheral border. An annular clamp 52 forms a surrounding grip around said border. It holds the two ring gears 20, 22 in place and joins them together to form a unit. Every ring gear 20, 22 may thereby be rotated with respect to the annular clamp. It would be sufficient if but one of the two ring gears were movable with respect to the annular clamp 52.

Shorter cylindrical bolts 54 and longer studs 56 protrude outward from the axial outer faces of the ring gears 20, 22, parallel to the axis 24. Hinge arms (not shown) may here be screwed onto said bolts or studs 54, 56, the cylindrical bolts 54 contributing to the strength whereas the studs 56 serve for fastening the structure.

Figure 2:
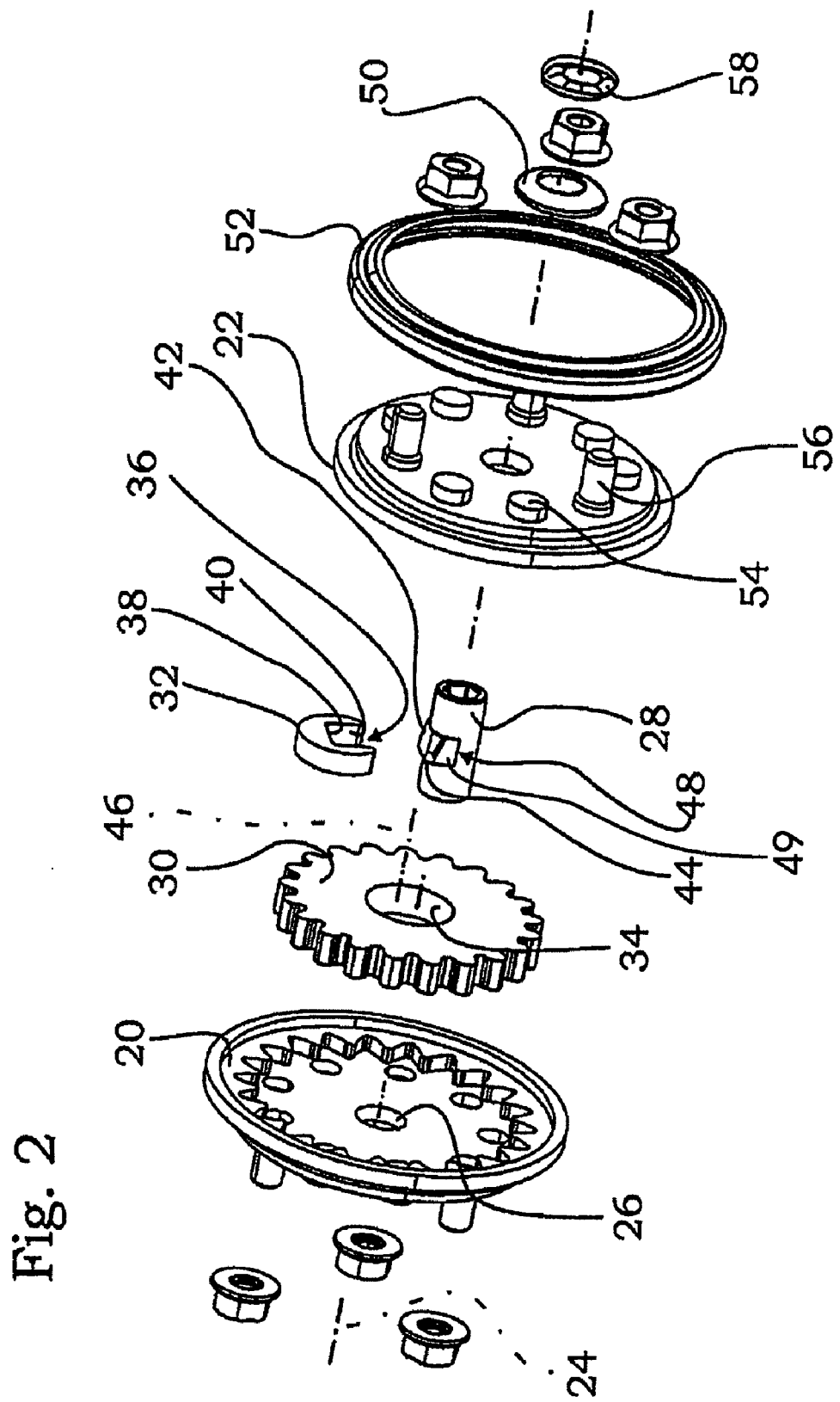
FIG. 2: is an illustration like FIG. 1, but now in an embodiment in which the elastic means is located outside the ring gears.

As contrasted to the first embodiment discussed above, the elastic means 50 in the embodiment shown in FIG. 2 is not located inside the two ring gears 20, 22 but outside of these. Now the material thickness of the driver member 32 is such that it is not allowed to move axially in the region between the two ring gears 20, 22. At need, additional means such as projections or sliding members are associated with the driver member 32 in order to prevent said driver member from moving in the axial direction.

The shaft 28, by contrast, is movable in the axial direction. Now, the elastic means 50 has the form of a Belleville spring washer or of a corrugated washer. It biases the shaft 28 in the axial direction; concretely, the shaft 28 is pulled to the right in FIG. 2. This movement causes the driver member 32 to move further upward, meaning it slides upward along the inclined surface of the wedge. A securing ring 58 is additionally provided, said securing ring being placed on the outer side of the elastic means 50 which it protects and holds.

What is claimed is:

1. A hinge mounting for an adjustable vehicle seat, more specifically a hinge mounting for a seat back of a motor vehicle seat comprising:
    a first ring gear, a second ring gear, said two ring gears being rotatable relative to each other about a central axis and being centered on said central axis, and
    a driver unit which comprises a) a shaft for initiating an adjusting movement, said shaft being centered on said central axis, b) a driver wheel defining a central, circular recess, c) a driver member that is located in said recess, fits against said recess and is rotationally joined to said shaft and d) a compensation unit comprising a wedge-shaped piece connected to said shaft, a mating surface cooperating with said wedge-shaped piece and formed on said driver member and a biasing member that biases said driver member in such a manner that said driver member is urged toward the top most point of said wedge-shaped piece, wherein said driver member defines a radial cut-out having a base formed by said mating surface and an outer surface centered on an eccentric axis offset by a distance e with respect to the central axis.

2. The hinge mounting as set forth in claim 1, wherein said cut-out has a width adapted to the diameter of said shaft.

3. The hinge mounting as set forth in claim 1, wherein said cut-out is substantially filled with said shaft and said wedge-shaped piece.

4. The hinge mounting as set forth in claim 1, wherein said two ring gears are internal ring gears and that said driver wheel comprises an external toothed surface.

5. The hinge mounting as set forth in claim 1, wherein said two ring gears have different numbers of teeth.

6. The hinge mounting as set forth in claim 5, wherein the difference between the number of teeth of the ring gears is one.

7. The hinge mounting as set forth in claim 1, wherein there is provided an annular clamp that forms a surrounding grip around the borders of said two ring gears so as to unite them and that allows rotation of said one ring gear with respect to said other one.

8. The hinge mounting as set forth in claim 1, wherein a projection is connected to said shaft, said projection forming said wedge-shaped piece, said wedge-shaped piece has a wedge-shaped surface and two lateral dog faces offset by 90° each with respect to said wedge-shaped surface and said lateral dog faces fit against side faces of the cut-out.

9. The hinge mounting as set forth in claim 8, wherein the projection comprises at least one abutment surface that fits axially against one of said ring gears.

10. The hinge mounting as set forth in claim 1, wherein said biasing member is one of disposed between said two ring gears and disposed outside of said two ring gears.

11. The hinge mounting as set forth in claim 1, wherein at least one of said driver member and said wedge-shaped piece are disposed so as to be movable in the axial direction relative to said driver wheel.

12. The hinge mounting as set forth in claim 1, wherein said driver member or said wedge-shaped piece is axially fixed so that it is not allowed to move relative to said driver wheel.

* * * * *